United States Patent Office 2,765,244
Patented Oct. 2, 1956

2,765,244

PROCESS FOR DEGRADING DEXTRAN IN THE PRESENCE OF A REDUCING AGENT

Maurice Stacey, Edgbaston, Birmingham, and Frederick George Edward Pautard, Aycliffe, Darlington, England, assignors to Dextran Limited, Darlington, England, a British company No Drawing. Application March 17, 1952, Serial No. 277,076

Claims priority, application Great Britain March 19, 1951

4 Claims. (Cl. 127—36)

This invention relates to the degradation of dextran.

Degraded (or partially depolymerised) dextran can be used with great advantage as the essential constituent of blood-plasma substitutes and other therapeutic fluids. The dextran itself may be produced by the action of micro-organisms, such as those of the leuconostoc species, on pure sucrose. The dextran so produced consists of carbohydrate macro-molecules of different sizes, each such molecule consisting of an aggregate of unitary molecules of the composition $C_6H_{10}O_5$. These macro-molecules are very large and, to enable this dextran to be used in a blood-plasma substitute or for other injections into the animal body, it is necessary to break down the macro-molecules to a smaller size or molecular weight. Moreover, it is known that macro-molecules of excessive size are incompatible with conditions existing in the human blood stream, and those of excessively small size may produce injurious effects on some organs of the body, particularly the kidneys. Therefore, after degrading the dextran so as to reduce its average molecular size it has also hitherto been necessary to treat the degraded dextran to eliminate both those molecules which have been inadequately reduced in size and those which are very small.

Since it is difficult to measure accurately the molecular weights of various dextrans the average size and weight of the molecules can be compared by reference to the relative viscosity of a solution of dextran. In this connection it should be mentioned that it is not certain whether dextran does in fact form a true solution, or whether the dextran is in colloidal dispersion in the solvent. In the present specification and claims the term "solution" is used to include dextran either dissolved or colloidally dispersed.

By relative viscosity is meant (for the purpose of the present description) the ratio of the kinematic viscosity of a solution of 6 g. of dextran in 100 cc. of distilled water at 37° C., measured in centistokes, to the kinematic viscosity of distilled water at the same temperature, using No. 1 or 2 British Standard Specification U-tube viscometers. The relative viscosity of the dextran before the degradation is high and may be of the order of 800. For use specifically in a blood-plasma substitute the dextran should have a low relative viscosity, preferably one within the range of 2.7 to 8. In this relative viscosity range the dextran is eminently suitable for intravenous use and for use as a vehicle for the intradermal or intramuscular injection of drugs. For the latter use the dextran may, however, have a somewhat higher, though still low, relative viscosity, e. g. 20.

Hitherto the degradation has commonly been effected by acid hydrolysis. Alkali hydrolysis has also been used, but is less easy to effect and control then acid hydrolysis. In addition, it has been proposed to use enzymatic degradation, which also involves hydrolysis. All these hydrolytic processes lead to a degraded product having molecules varying largely in weight and subsequent selective treatment is required. As a result of this treatment a substantial proportion of the original dextran is eliminated and wasted.

It is an object of this invention to provide an improved method of degrading dextran.

It is another object so to degrade dextran as to eliminate the need for selective treatment of the degraded product.

It is a further object of the invention to provide a novel dextran product suitable for use in a therapeutic material.

In the present invention, the degradation is effected by pyrolysis, i. e. by heating the dextran so as to rupture the weaker bonds, especially the hydrogen bonds, in the large molecules.

It is well known that the application of excessive heat to any carbohydrate molecule either in the wet state at any pH or in the dry state leads to oxidative destruction. The destruction is manifested by formation of oxy-aldehydes and acids which combine together to give dark-coloured polymeric substances termed caramels. In the present invention gross oxidative destruction is prevented by carrying out the process under non-oxidising conditions. It is also of course necessary not to use a high temperature.

This pyrolysis or thermal degradation may be effected in a variety of ways. Thus the dextran may be converted into a powder which may be heated dry or in suspension in a chemically inert liquid. Preferably, however, the dextran is heated in aqueous solution while maintaining the pH at between 7.00 and 7.05, i. e. maintaining the solution as close to neutral as possible, which can be done by buffering the solution. Within this pH range substantially no hydrolytic action can take place and substantially all the degradation is pyrolytic. This is a matter of importance, since hydrolytic action leads to random cleavage of the dextran, catalysed by hydroxyl and hydrogen ions, with the result that the degraded molecules differ largely in weight. This random cleavage, however, is largely suppressed in the invention, so that the more regularly spaced weak linkages, susceptible to thermal rupture, are preferentially broken. In consequence the degradation can be far more effectively controlled and much less dextran is lost. Although the degradation is preferably effected in such a way that no, or substantially no, hydrolysis can occur, it is possible to treat a solution within a wider pH range if desired, say from 6.5 to 9.5, and still to effect the greater part of the degradation by thermal rupture. There is little harm in proceeding on the alkaline side of neutrality, but on the acid side the uniformity of molecular weight is rapidly lost as the pH drops, so it is highly desirable to avoid the use of a pH below 7.

When the dextran is heated as an aqueous solution, the dextran may be present in a concentration up to 50%. Very dilute solutions are uneconomical and highly concentrated solutions are viscous and not easy to heat uniformly. It is preferred to use aqueous solutions of at least 12% w./v. concentration, and most conveniently from 20 to 30% concentration. This represents an important advantage over the acid hydrolysis process, which is, in practice, limited to the use of aqueous solutions of a concentration considerably below 12% w./v.

Instead of buffering the solution, its pH may be regulated at a frequency sufficient to avoid the pH departing from the desired range.

In carrying out the invention, the temperature of the heating is preferably between 115 and 230° C. Temperatures lower than 115° C. can be used, but then the pyrolysis is extremely slow, and indeed it is best to work at 140° C. or higher. Temperatures above 230° C. can be used, but an upper limit is imposed by the fact that dextran chars when heated to too high a temperature, and practical considerations make it desirable not to work above 200° C.

In general, using an aqueous solution of dextran of from 20 to 30% w./v. concentration, it is found that to attain a reasonably homogeneous product a low reaction rate, as measured by plotting relative viscosity against time, is required.

It is best not merely to make the conditions non-oxidising but also reducing. Sodium sulphite is a particularly useful reducing agent, but other reducing agents may be used and may be solid, liquid or gaseous. Examples of solid reducing agents are other metallic sulphites, metallic sulphides, powdered aluminium, hydroquinone and pyrogallol. Iron carbonyl is an example of a liquid reducing agent, and sulphur dioxide is an example of a gaseous reducing agent. Of course the reducing agent chosen must not react chemically with the dextran under the conditions of degradation. When non-oxidising but not reducing conditions are employed, dextran as a powder or in solution may be heated in an inert atmosphere of, for example, steam, nitrogen or helium, or in air from which most of the oxygen has been removed.

When the invention is carried out in the preferred way with sodium sulphite as a reducing agent, all the degraded dextran may be used as the essential constituent of a blood-plasma substitute. In other words, fractional precipitation is not necessary, but rather in the dextran as degraded the molecules are all in a suitable weight range. In this respect the products of the preferred process are distinguished from hydrolytically degraded dextran.

Some examples will now be given.

Example 1

This is an example of the preferred way of carrying out the invention. Macro-molecular dextran was precipitated from a fermentation liquor by the addition of acetone in equal volume. The supernatant liquid was poured away from the gum, which was subsequently re-dissolved in water by the cautious entry of live steam into the dextran to form a solution containing 12% w./v. of dextran. To this solution was added 25% anhydrous sodium sulphite, 20% sodium bicarbonate and 2% calcium carbonate (all percentages being by weight of the dextran). The sulphite and bicarbonate were added as concentrated solutions and the insoluble calcium carbonate as a thick cream. The mixture was then digested in a stirred, jacketed vessel at a temperature of about 110° C. for a period of one hour, practically no degradation taking place at this temperature. The sodium bicarbonate was added to neutralise acid initially produced in the dextran during the digestion, and the calcium carbonate was added to neutralise any acid produced in the later stages of the digestion. Acetone remaining in the gum and carbon dioxide gas were removed by frequent controlled venting of the vapours. At the end of the digestion the pH was adjusted to 7.00 using sodium dihydrogen phosphate which, being a buffer, served also to maintain the pH substantially at 7.00.

The mixture, which at this stage had a relative viscosity of 300, was put in an autoclave and heated at a temperature of 160° C. at 70–80 lbs. sq. in. steam pressure. The decrease in viscosity was measured at time intervals, the reaction being stopped after 20 hours, when the viscosity had fallen to 4.48. The fall in relative viscosity is shown in the table below:

| | Relative viscosity |
|---|---|
| After heating for 2 hours | 146 |
| After heating for 6 hours | 41.3 |
| After heating for 10 hours | 16.1 |
| After heating for 12 hours | 7.00 |
| After heating for 15 hours | 6.14 |
| After heating for 17 hours | 4.50 |
| After heating for 20 hours | 4.50 |

To purify the product, the degraded mixture was filtered, and the filtrate precipitated with acetone until non-dextran matter was sufficiently removed, the dextran being redissolved in water after each precipitation. After a final filtration and evaporation to remove all traces of acetone, a clear water-white solution of dextran was obtained with the desirable viscosity of 4.50.

A blood-plasma substitute was prepared by adjusting the pH of a 6% w./v. solution of this dextran to 7 after 0.9% w./v. of sodium chloride had been added. The solution was then sterilised and was ready for use.

Example 2

This is an example of the heating of a solution under non-oxidising conditions without any reducing agent. A 12% w./v. aqueous solution of dextran containing calcium carbonate equal to 20% w./w. of the dextran was heated in an autoclave while stirring at 150° C., air, and therefore available oxygen, being removed by allowing steam to escape at the beginning of the process. Care was exercised in adjusting the pH of the solution by addition of sulphuric acid to as close to 7.00 as was practicable, and the heating was carried out for a total of 24 hours, during which time the pH was adjusted at intervals to neutrality and samples of the solution were removed to enable the course of the degradation to be ascertained. After this treatment the relative viscosity, initially 800, had fallen to 3.65.

After isolating and removing impurities from the product, a blood-plasma substitute was prepared from it by adjusting the concentration to 6% w./v. and the pH to 7.00 and adding 0.9% w./v. of sodium chloride, the resulting mixture finally being sterilised in an autoclave.

Example 3

This is a modification of Example 2, a reducing agent being used. The calcium carbonate was reduced to 10% w./w. and 20% w./w. of sodium sulphite was added, and the heating was effected for 9 hours only, the pH being maintained in the range 6.8–7.1. At the end of the reaction the relative viscosity of the product at 6% w./v. concentration was 4.2, having been initially 800. The product thus obtained with a reducing agent was lighter in colour than that of the previous example, which had been exposed to atmospheric oxygen during the occasions when checks of the pH had been made.

Example 4

This is an example of the degradation of a dry powder. First a solution of dextran was prepared and sodium sulphite amounting to 25% w./w. of the dextran was added, and the pH of the solution was adjusted to pH 7.00 by the addition of sulphuric acid. The mixture was then dried in an oven in shallow trays at 110–120° C., while the viscosity fell from 800 to approximately 50, i. e. some degradation took place during the drying. The pH remained at 7.00 and there was no discoloration beyond a pale straw colour. The dried dextran was present as flakes, which were then ground in a mill to a fine powder, and subjected to further heating for 45 minutes in a rotary kiln, electrically heated and thermostatically controlled to a temperature of 160° C. The powder was redissolved in water and the relative viscosity was found to be 4.80. After isolation and purification of the product, a blood-plasma substitute was prepared by adding a 0.9% w./v. solution of sodium chloride to a 6% w./v. solution of the product and adjusting the pH of the mixture to 7.00. The solution was then sterilised in an autoclave.

A powder may be heated in a variety of other ways than in a heated chamber, e. g. by infra-red radiation or by high-frequency electrical action.

Example 5

This is an example of heating a powder in an inert liquid. A 12% w./v. aqueous dispersion of dextran containing 20% w./w. sodium sulphite was dried at pH 7.0 to 7.2 and powdered. The powder was then dispersed in purified paraffin of boiling point 200° C. and heated for 90 minutes at 150° C. after which the powder was allowed to settle, the paraffin decanted and the residue washed with acetone. Finally, after being dispersed in distilled water, the product was purified as described above and the relative viscosity of a 6% w./v. aqueous solution was found to have fallen from 400 to 3.5.

It will be understood that it is hardly possible to remove every trace of moisture from powdered dextran or to exclude every trace of moisture from a reaction vessel. The small quantities of moisture necessarily present during the heating of technically dry powder are adequate to supply the radicals required to satisfy the broken bonds of the large dextran molecules.

We claim:

1. In the degradation of dextran of high molecular weight to produce dextran of lower molecular weight suitable for use in a therapeutic fluid, the step which comprises heating said dextran to high molecular weight in aqueous solution in the presence of a reducing agent to a temperature between 115 and 230° C. while maintaining the pH of said solution between 6.5 and 9.5.

2. The degradation of dextran as claimed in claim 1 in which the reducing agent is sodium sulphite.

3. In the degradation of dextran of high molecular weight to produce dextran of lower molecular weight suitable for use in a therapeutic fluid, the step which comprises heating said dextran of high molecular weight in aqueous solution in the presence of a reducing agent to a temperature between 115 and 230° C. while maintaining the pH of said solution between 7.00 and 7.05.

4. In the degradation of dextran of high molecular weight to produce dextran of lower molecular weight suitable for use in a therapeutic fluid, the step which comprises heating said dextran of high molecular weight in aqueous solution in the presence of a reducing agent to a temperature between 140 and 200° C. while maintaining the pH of said solution between 7.0 and 9.5.

References Cited in the file of this patent

UNITED STATES PATENTS

| | | |
|---|---|---|
| 432,358 | Berge | July 15, 1890 |
| 2,437,518 | Gronwall et al. | Mar. 9, 1948 |
| 2,565,507 | Lockwood | Aug. 28, 1951 |
| 2,719,147 | Wolff et al. | Sept. 27, 1955 |

FOREIGN PATENTS

| | | |
|---|---|---|
| 675,085 | Great Britain | July 2, 1949 |
| 630,914 | Great Britain | Oct. 24, 1949 |

OTHER REFERENCES

Manufacturing Chemist, February 1952, vol. 32, No. 2, pages 49–54.

Kerr-Chem. and Industry of Starch, 2nd ed., N. Y. 1950, pages 357–369.